United States Patent [19]

Taig

[11] Patent Number: 4,850,457
[45] Date of Patent: Jul. 25, 1989

[54] ELECTRICALLY ACTUATED DISC BRAKE
[75] Inventor: Alistair G. Taig, Edwardsburg, Mich.
[73] Assignee: Allied-Signal Inc., Morristown, N.J.
[21] Appl. No.: 105,756
[22] Filed: Oct. 7, 1987
[51] Int. Cl.⁴ .............................................. F16D 55/16
[52] U.S. Cl. .................... 188/72.1; 188/72.7; 188/156; 74/805
[58] Field of Search ................ 188/72.1, 72.7, 72.8, 188/156, 157, 162, 158; 74/752 F, 785, 394, 781 R, 805; 403/356, 380, 336; 303/3, 20, 101

[56] References Cited

U.S. PATENT DOCUMENTS

| | | | |
|---|---|---|---|
| 3,514,136 | 5/1970 | Kennicott | 403/380 |
| 3,842,949 | 10/1974 | Newstead | 188/170 |
| 4,603,594 | 8/1986 | Grimm | 188/171 |
| 4,658,939 | 4/1987 | Kircher et al. | 303/101 |

FOREIGN PATENT DOCUMENTS

| | | |
|---|---|---|
| 0109918 | 5/1984 | European Pat. Off. . |
| 0129969 | 1/1985 | European Pat. Off. . |
| 3423510 | 1/1986 | Fed. Rep. of Germany . |
| 2337285 | 9/1977 | France ............................ 188/72.8 |
| 56-31532 | 3/1981 | Japan . |
| WO82/00172 | 2/1982 | U.S.S.R. . |
| 2156021 | 10/1985 | United Kingdom . |

Primary Examiner—Andres Kashnikow
Assistant Examiner—Mark T. Le
Attorney, Agent, or Firm—Larry J. Palguta; Ken C. Decker

[57] ABSTRACT

The electrically actuated disc brake (10) comprises a caliper (12) having a bore (16) receiving therein an actuating mechanism (90), and an electric motor (40) attached to the caliper housing (12). The actuating mechanism (90) comprises a planetary gear mechanism (50) which includes a sun gear (52), planetary gears (54), and a pair of ring gears (70, 80). An actuator sleeve (68) is disposed about the ring gears (70, 80) and contains a helical groove (69) disposed opposite a complementary-shaped helical groove (89) in a rotatable ring gear (80). The helical grooves (69, 89) receive therebetween a bearing mechanism (85) biased by a spring (87) toward a fixed stop (86) located within the helical grooves (69, 89). Operation of the electric motor (40) effects rotation of the rotatable ring gear (80) and axial displacement of the actuator sleeve (68) into engagement with a thrust pad (96) located adjacent one of the friction elements (18) so that the caliper (12), by reaction, displaces the other friction element (20) into engagement with the rotor (22).

13 Claims, 2 Drawing Sheets

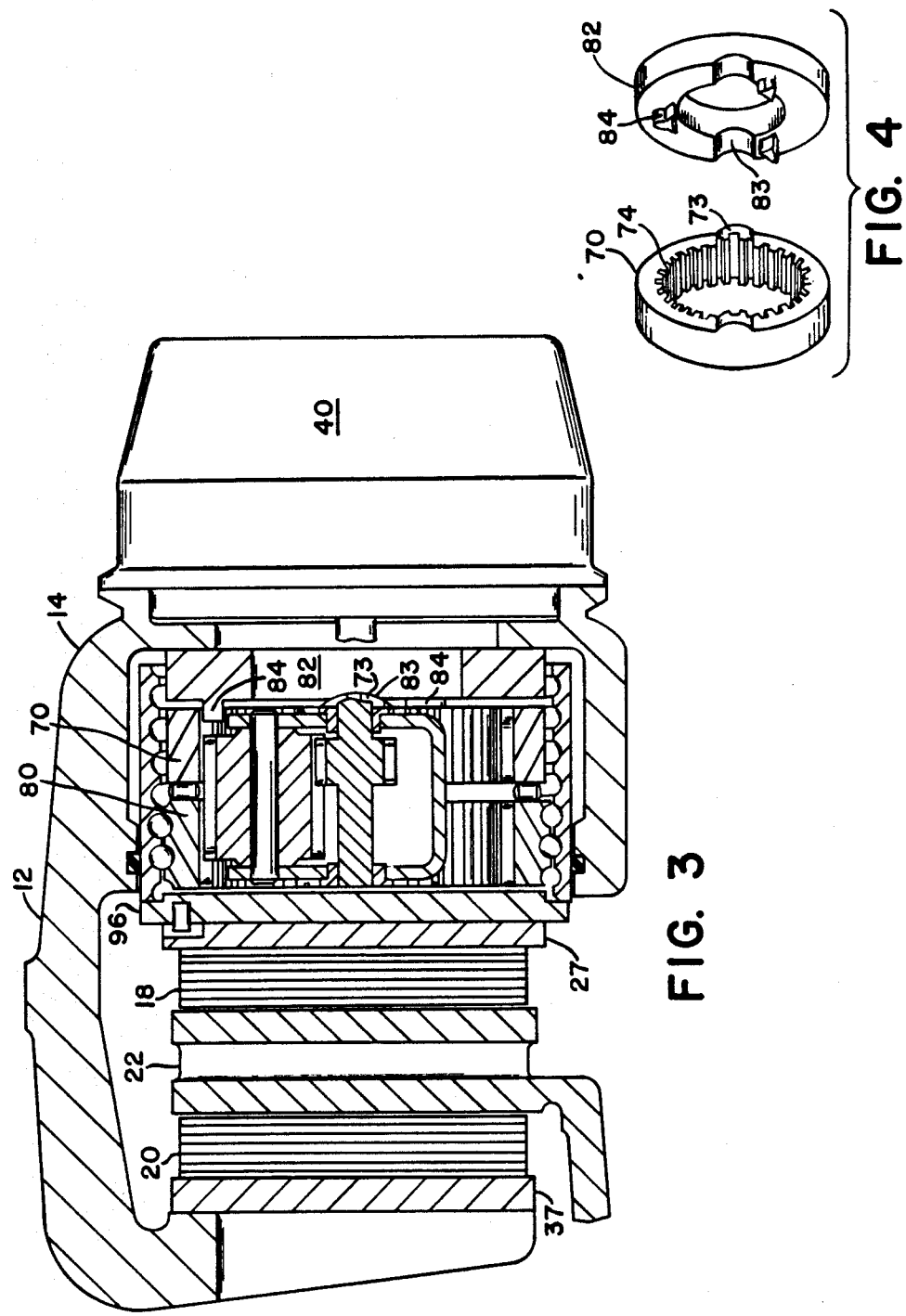

ELECTRICALLY ACTUATED DISC BRAKE

This invention relates generally to a disc brake that may be operated by a motor connected with a planetary gear mechanism.

Disc brakes have been utilized for many years in passenger cars, heavy duty trucks, and aircraft. Because of the increasing emphasis on reducing the weight of vehicles and simplifying the components thereof, it is desirable to develop a braking system that is operated electrically. Such a braking system must be highly reliable, cost effective, and practical within the packaging constraints of the particular vehicle. The present invention provides a disc brake that may be operated by an electric motor, or other rotary operating motor mechanisms, connected with a planetary gear mechanism. The disc brake may be operated to provide service brake application or to provide a parking brake application. The result is a highly reliable, low cost, electrically operated disc brake which will fit readily within the packaging constraints of several vehicles.

The present invention comprises a disc brake operated by electric motor means, comprising a caliper having a bore aligned with the motor means, the bore having an actuating mechanism disposed therein, the actuating mechanism and caliper actuatable to displace a pair of friction elements into engagement with a rotor, characterized in that the actuating mechanism comprises a planetary gear assembly disposed within said bore and comprising a sun gear, a carrier, planetary gears, and a pair of ring gears, the electric motor means coupled with the sun gear which drives the planetary gears, one ring gear fixed to the caliper and the other ring gear rotatable by said planetary gears, an actuator sleeve disposed about the other ring gear, and bearing means disposed between said other ring gear and actuator sleeve, so that operation of said electric motor means effects rotation of the other ring gear and displacement of the bearing means which effects axial displacement of the actuator sleeve to cause one of said friction elements to be displaced and the caliper, by reaction, displacing the other friction element into engagement with the rotor.

The invention described below with reference to the drawings which illustrate embodiments in which:

FIG. 3 is a section view of a second embodiment; and

FIG. 4 is an isometric view of the nonrotatable ring gear and plate of FIG. 3.

Figures 1, 2:
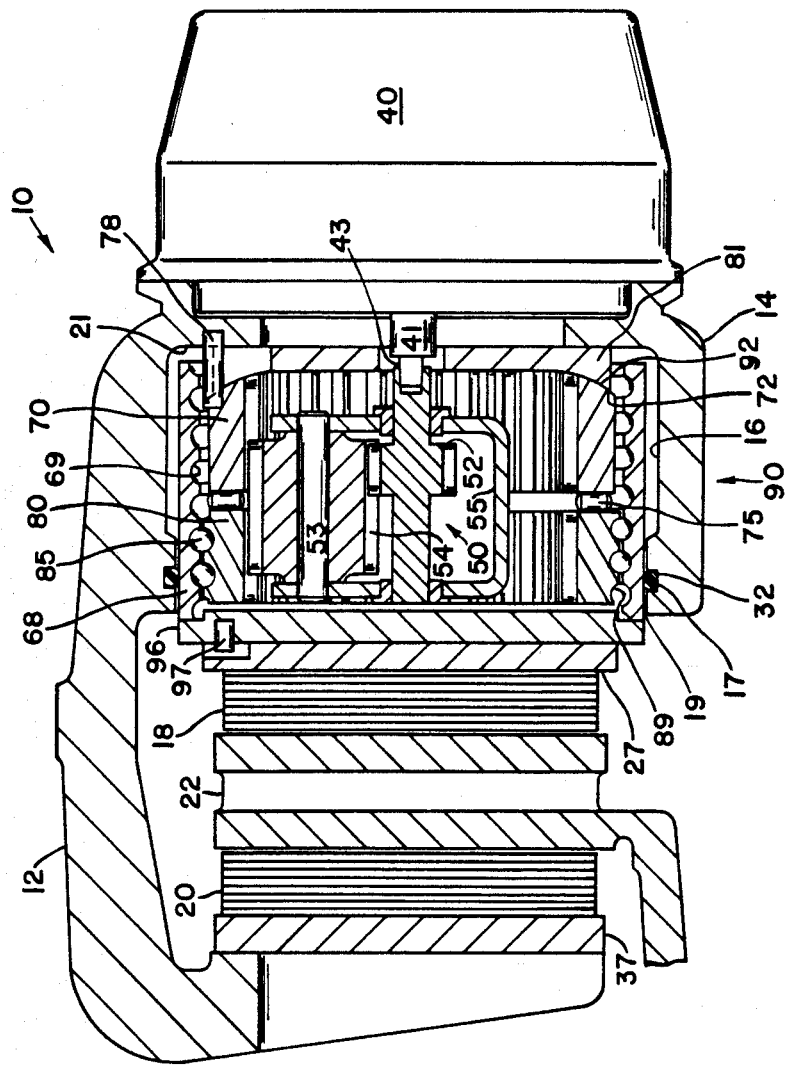
FIG. 1 is a section view of a first embodiment.
FIG. 2 is a partial view of the other ring gear and bearing mechanism.

The disc brake of the present invention is referenced generally by numeral 10 in FIG. 1. Disc brake 10 comprises a brake that is operated by motor means 40. Motor means 40 may comprise an electric motor or other motor mechanisms that provide a rotary output via shaft 41 and coupling 43. Disc brake 10 includes a caliper 12 having a caliper housing 14 with a bore 16. Caliper 12 extends over a pair of friction elements 18 and 20 which may be displaced toward one another in order to brake a rotor 22. The bore 16 comprises a groove 17 adjacent opening 19, and bore end 21. Seal 32 is disposed within groove 17. Located within bore 16 is an actuating mechanism referenced generally by numeral 90. Actuating mechanism 90 comprises a planetary gear assembly 50 which includes a sun gear 52, three planetary gears 54 (the other two not shown in the section view), a carrier 55, pins 53 which carry the planetary gears, two ring gears 70, 80, and thrust bearings 75. Each ring gear has internal teeth, and ring gear 80 is rotatable but has fewer teeth than ring gear 70 which is operatively coupled with caliper housing 14. The planetary gear assembly 50 comprises the planetary gear assembly disclosed in U.S. Pat. No. 4,793,447 entitled "Electrically Operated Disc Brake" which is incorporated by reference herein. Because the two ring gears 70 and 80 have different numbers of teeth, the planetary gear assembly 50 has a high reduction ratio, as disclosed in U.S. Pat. No. 4,793,447. Ring gear 70 is rotatably fixed relative to caliper housing 14 by means of a key 78 which is received within complementary-shaped recesses in the caliper housing and ring gear 70. Located between ring gear 70 and bore end 21 is a spherical abutment washer 81 which has a spherical surface 92 that mates slidingly with spherical surface 72 of ring gear 70. The spherical abutment washer has a recess opening which receives key 78 so that it also is nonrotatably fixed relative to caliper housing 14. However, because rotatably fixed ring gear 70 may slide relative to the abutment washer 81, the actuating mechanism 90 may center or axially misalign itself relative to the caliper housing 14. Located about the ring gears is an actuator sleeve 68 having disposed therein a helical groove 69. Rotatable ring gear 80 has a helical groove 89, and a plurality of bearing balls 85 are disposed between the helical grooves 69, 89. As illustrated in FIG. 2, the helical groove 89 receives the plurality of balls 85 which engage a fixed stop 86 disposed in groove 89. The fixed stop 86 may be located in either of the helical grooves 89 or 69. A spring 87 also engages a fixed stop (not shown) disposed within either of the grooves and biases the balls 85 toward the fixed stop 86. The balls do not recirculate but are held against the fixed stop 86 when there is no load applied to the bearing balls. The spring 87 allows a limited movement of the bearing balls 86 in the helical groove 89 when the gear 80 is rotated and advances axially the actuator sleeve 68.

Actuator sleeve 68 engages a thrust pad 96 which bears against the backing plate 27 of inner friction element 18, pad 96 restrained from rotating by a pin 97 or by any other alternative keying mechanism.

In operation, mechanism 90 begins from the rest position shown in FIG. 1 wherein friction elements 18, 20 are disposed clear of rotor 22. When the driver applies the vehicle brakes, a force-sensitive signal from the brake pedal is sent to a controller (not shown) which conditions and amplifies the output to supply current to the motor 40. Rotation of motor shaft 41 and sun gear 52 causes ring gear 80 to rotate at a greatly reduced speed so that ball bearings 85 advance actuator sleeve 68 against thrust pad 96 and displace friction elements 18 and 20 into engagement with rotor 22. Axial displacement of element 18 causes caliper 12, by reaction, to displace backing plate 37 and pad friction element 20 into engagement with rotor. Increased brake pedal force increases the current in motor 40 and advances further actuator sleeve 68. When the input signal is released, bearing balls 85 are reversible via spring 87, and this causes ring gear 80 to reverse rotation until only a small load remains on the friction elements. The controller senses release of an applied load and a small reverse current is applied to motor 40 for a predetermined short period of time so that mechanism 90 retracts positively actuator sleeve 68. A a result, bearing balls 85 are in an unloaded condition and spring 87 biases them to a return position against fixed stop 86.

The electrically actuated disc brake provides several distinct advantages. The electric brake is self-powered and needs no pumps or special force multiplying mechanisms. The conventional master cylinder contained in braking systems is eliminated, and all brakes can be independent of one another which provides distinct safety advantages. The brake mechanism provides electrically actuated brakes, positive brake retraction in order to eliminate drag of the friction elements on the rotor, and the mechanism is self adjusting in order to compensate for wear of the friction elements. The electric signals communicated to each disc brake can be modified easily in conjunction with a vehicle anti-skid system, and trailer brakes need only electrical connections.

FIG. 3 shows an alternative construction for providing self-alignment or axially misalignment of mechanism 90 relative to caliper 12. Rotatably fixed ring gear 70 includes a pair of cylindrical protrusions disposed opposite one another along a diameter of gear 70. Protrusions 73 are shaped complementary to cylindrical recesses 83 formed in plate 82. Plate 82 includes a plurality of teeth 84 (see FIG. 4) which are received within teeth grooves 74 of ring gear 70. Plate 82 is fixed to caliper housing 14. The teeth 84 prevent rotation of ring gear 70 relative to caliper 12. Cylindrical protrusions 73 have their centerline close to the plane of rotation containing seal 32 in order to facilitate rotation of actuator mechanism 90 for alignment purposes, which includes axial misalignment of mechanism 90 relative to caliper 12.

Other provisions of the invention or variations will become apparent to those skilled in the art and will suggest themselves from the specific applications of the invention. It is intended that such variations and revisions of the invention, as reasonably to be expected on the part of those skilled in the art, to suit individual design preference and which incorporate the herein disclosed principles, will be included within the scope of the following claims as equivalents thereof.

I claim:

1. A disc brake operated by electric motor means, comprising a caliper having a bore aligned with the motor means, the bore having an actuating mechanism disposed therein, the actuating mechanism and caliper actuatable to displace a pair of friction elements into engagement with a rotor, the actuating mechanism comprising a planetary gear assembly disposed within said bore and comprising a sun gear, a carrier, planetary gears, and a pair of ring gears, the electric motor means coupled with the sun gear which drives the planetary gears, one ring gear connected with the caliper and the other ring gear rotatable by said planetary gears, an actuator sleeve disposed about the other ring gear, bearing means disposed between said other ring gear and actuator sleeve, a spherical abutment washer disposed adjacent said one ring gear, the spherical abutment washer having a spherical surface mating with a complementary-shaped surface formed on the one ring gear to permit axial misalignment of the actuating mechanism relative to said caliper, operation of said electric motor means effecting rotation of the other ring gear and displacement of the bearing means which effects axial displacement of the actuator sleeve to cause one of said friction elements to be displaced and the caliper, by reaction, displacing the other friction element into engagement with the rotor.

2. The disc brake in accordance with claim 1, wherein the spherical abutment washer includes an opening receiving therein a key, the key anchoring the spherical abutment washer and one ring gear relative to the caliper.

3. The disc brake in accordance with claim 1, wherein the caliper includes sealing means disposed adjacent an opening of said bore, the sealing means engaging an outer surface of said actuator sleeve.

4. The disc brake in accordance with claim 1, further comprising thrust bearing means disposed between said ring gears.

5. The disc brake in accordance with claim 1, further comprising a thrust pad disposed between said actuator sleeve and the one friction element.

6. The disc brake in accordance with claim 5, wherein the thrust pad includes connection means connecting the thrust pad nonrotatably with said one friction element.

7. The disc brake in accordance with claim 1, wherein the other ring gear and the actuator sleeve each include circumferential grooves therein, the bearing means disposed in said circumferential grooves.

8. A disc brake operated by electric motor means, comprising a caliper having a bore aligned with the motor means, the bore having an actuating mechanism disposed therein, the actuating mechanism and caliper actuatable to displace a pair of friction elements into engagement with a rotor, the actuating mechanism comprising a planetary gear assembly disposed within said bore and comprising a sun gear, a carrier, planetary gears, and a pair of ring gears, the electric motor means coupled with the sun gear which drives the planetary gears, one ring gear connected with the caliper and the other ring gear rotatable by said planetary gears, an actuator sleeve disposed about the other ring gear, bearing means disposed between said other ring gear and actuator sleeve, a face plate disposed between said one ring gear and an end of said bore, the one ring gear including, along a diameter thereof, cylindrical protrusion means received slidably within cylindrical recess means formed in the plate, so that said actuating mechanism may axially misalign relative to the caliper, operation of said electric motor means effecting rotation of the other ring gear and displacement of the bearing means which effects axial displacement of the actuator sleeve to cause one of said friction elements to be displaced and the caliper, by reaction, displacing the other friction element into engagement with the rotor.

9. The disc brake in accordance with claim 8, wherein the face plate includes a plurality of axial teeth which are received within complementary-shaped openings in the one ring gear, so that the one ring gear is positioned nonrotatably relative to the caliper.

10. A disc brake actuated by motor means, comprising a caliper having a bore with an actuating mechanism disposed therein, the actuating mechanism and caliper actuatable to displace a pair of friction elements into engagement with a rotor, the actuating mechanism comprising a planetary gear assembly disposed within said bore and including a sun gear, planetary gears, and a pair of ring gears, the motor means coupled with said sun gear which drives the planetary gears, one ring gear connected with said caliper and the other ring gear rotatable by said planetary gears, an actuator sleeve disposed about said other ring gear, the actuator sleeve and other ring gear including complementary-shaped grooves therein, bearing means disposed within the grooves between the actuator sleeve and other ring gear, and a plate disposed between said one ring gear and an end of said bore, the plate including cylindrical recess means receiving slidably therein cylindrical protrusion means extending, along a diameter thereof, from the one ring gear so that the actuating mechanism may axially misalign relative to the caliper, operation of said motor means causing rotation of said other ring gear and operative displacement of said actuator sleeve to cause displacement of one of said friction elements so that the caliper, by reaction, displaces the other friction element into engagement with said rotor.

11. A disc brake actuated by an electric motor, comprising a caliper having a bore with an actuating mechanism disposed therein, the actuating mechanism and caliper actuatable to displace a pair of friction elements into engagement with a rotor, the actuating mechanism comprising a planetary gear assembly disposed within said bore and including a sun gear, planetary gears, and a pair of ring gears, the electric motor coupled with said sun gear which drives the planetary gears, one ring gear connected with said caliper and the other ring gear rotatable by said planetary gears, an actuator sleeve disposed about said other ring gear, the actuator sleeve and other ring gear including therein complementary-shaped grooves, and bearing means disposed within the grooves between the actuator sleeve and other ring gear, the bearing means comprising a plurality of balls biased by resilient means disposed within the grooves, the grooves comprising helical grooves and the resilient means comprising a spring which biases the plurality of balls toward engagement with a fixed stop disposed within said grooves, and the actuating mechanism further comprising a spherical abutment washer disposed between said one ring gear and an end of said bore, and key means received by said spherical abutment washer and one ring gear so as to dispose nonrotatably the one ring gear relative to the caliper, operation of said motor causing rotation of said other ring gear and operative displacement of said actuator sleeve to cause displacement of one of said friction elements so that the caliper, by reaction, displaces the other friction element into engagement with said rotor.

12. The disc brake in accordance with claim 11, further comprising a sealing ring disposed adjacent an opening of said bore and engaging an outer surface of said actuator sleeve.

13. The disc brake in accordance with claim 12, further comprising thrust means disposed between said ring gears.

* * * * *